United States Patent [19]

Bentvelsen

[11] Patent Number: 4,934,096
[45] Date of Patent: Jun. 19, 1990

[54] APPARATUS FOR AUTOMATICALLY WATERING PLANTS

[75] Inventor: Gerardus J. Bentvelsen, Maassluis, Netherlands

[73] Assignee: Innocom (Electro) B.V., Gravenzande, Netherlands

[21] Appl. No.: 248,040

[22] Filed: Sep. 23, 1988

[30] Foreign Application Priority Data

Sep. 24, 1987 [NL] Netherlands ................ 8702286

[51] Int. Cl.⁵ ............................................. A01G 31/00
[52] U.S. Cl. ............................................. 47/62; 41/79
[58] Field of Search ............................ 47/59, 62, 79, 30

[56] References Cited

U.S. PATENT DOCUMENTS

| 3,543,437 | 12/1970 | Gains | 47/59 |
| 3,807,088 | 4/1974 | Jones | 47/62 |
| 4,037,362 | 7/1977 | Finck | 47/59 |
| 4,248,013 | 2/1981 | Allen | 47/59 |
| 4,302,906 | 12/1981 | Kawabe | 47/62 |
| 4,557,071 | 12/1985 | Fah | 47/62 |

FOREIGN PATENT DOCUMENTS

| 322264 | 1/1975 | Austria . |
| 0142989 | 11/1985 | European Pat. Off. . |
| 2813410 | 4/1979 | Fed. Rep. of Germany . |
| WO8600494 | 4/1986 | PCT Int'l Appl. . |

Primary Examiner—Henry E. Raduazo
Attorney, Agent, or Firm—Bachman & LaPointe

[57] ABSTRACT

Apparatus for automatically watering plants, comprising a fluid tight reservoir containing a substrate onto which the plants are positioned, means to apply fluid to said plants and means to receive the not directly absorbed fluid and conduct said fluid to a measuring reservoir. Analog level detectors are used to generate level proportional signals to a processor in which these signals are compared with reference signals to generate control signals to said means for applying fluid.

9 Claims, 6 Drawing Sheets

APPARATUS FOR AUTOMATICALLY WATERING PLANTS

The invention relates to an apparatus for automatically watering plants, comprising:
a fluid tight reservoir containing a substrate onto which the plants are positioned;
a gutter running underneath said reservoir in open communication with the bottom of said reservoir, whereby within said gutter and at least on a part of the bottom of the reservoir a fluid absorbing matting is installed;
a measuring reservoir in open communication with said gutter;
level measuring means installed within said measuring reservoir;
a conduit system, connected through a pump to a fluid reservoir and comprising a fluid dispensing orifice for each of said plants;
a processor receiving signals from said level measuring means and supplying control signals to said pump.

Such an apparatus is known from the Dutch patent application 83.03579. In this prior art apparatus, the level measuring means are embodied as level probes in the form of rods or stripes, made of electrically conducting material and mounted into the measuring reservoir by means of mechanical clamping elements such that the lower ends thereof are positioned at the maximum and minimum level respectively. These level probes are connected through suitable wires to the processor which in this case may consist of a number of simple detection circuits for determining if the probes are earthed through the liquid or not. If the fluid level descends underneath the minimum level then the contact between the minimum level probe and the fluid is interrupted, which interruption is detected in the processor in response whereto a signal is generated for activating the pump. By means of the pump watering fluid is pumped into the conduit system and is delivered drop by drop to each of the plants through said fluid dispensing orifices. Because the fluid is supplied to the plants significantly faster than it is absorbed by the plants the level in the measuring reservoir will rise. As soon as the lower end of the maximum level probe comes into contact with the fluid in the measuring reservoir the processor generates a signal to switch off the pump. This process is repeated in a sequential order.

The use of mechanically adjustable level probes has the disadvantage that, in case the plant grower for one reason or another finds it desirable to adjust one or both levels to another position, then he has to manipulate the mechanical clamping means which is experienced as rather difficult. Furthermore because of said mechanical adjustment an accurate level setting with these type of probes is hardly possible as practice has proved.

Furthermore with this prior art apparatus no insight information is obtained about the way in which the plants do respond to the watering. The desired maximum and minimum levels for certain plants have to be adjusted by the grower on the basis of his experience and on the basis of his personal observation of the growth behaviour of the plants.

An object of the invention is now to embody the apparatus, mentioned in the first paragraph of this specification such that the level adjustment will be significantly simplified so that the ease of operation of the apparatus for the grower will be enhanced. Furthermore a better understanding will be obtained in the functioning of the apparatus, in the way in which the plants respond to the behaviour of the apparatus and in the influence of the environmental conditions on the water evaporation of the plant.

According to the invention the apparatus of the type, mentioned in the heading paragraph is characterized in that:
the level measuring means are embodied as analog level measuring means generating a signal to be delivered to said processor proportional to the fluid level in said measuring reservoir;
adjustment means are present for supplying at least reference signals, determining the maximum level and the minimum level, to said processor; and
the processor compares the output signal of the level measuring means or a signal derived therefrom with the reference signals to start the operation of the pump in case one predetermined signal combination is detected and to stop the functioning of the pump in case another predetermined signal combination is detected.

By using analog measuring means delivering an analog signal and by a suitable processing of this analog signal, a better understanding can be obtained about the evaporation of the plants, which for a grower is often a vital piece of information. In this respect a preferred embodiment of the apparatus according to the invention is characterized in that the processor generates an output signal, related to the derivative of the level measuring means signal, which output signal can be used for controlling systems for influencing the environmental climate, such as systems for heating, ventilation, illumination, $CO_2$-dosing, sunlight- or energy screening, air humidity control.

In general, the level measuring means signal as well as the derivative thereof can be used in a suitably programmed computer to generate, on the basis thereof, control signals for controlling the functioning of various types of climate control devices.

A further embodiment is characterized in that the processor comprises means of software to determine the derivative of the level measuring means signal and therewith the velocity with which the fluid level in the measuring reservoir changes, to control the operation of the pump therewith.

Based on the determined velocity, conclusions can be drawn about the evaporation of the plant. On the basis of the measured velocity, start- and stop signals for the pump can be generated. In such an embodiment, the evaporation velocity is therefor the major criterium for the pump control and not the actual level of the measuring reservoir.

The above-mentioned adjustment means may for instance comprise accurately adjustable potentiometers, thumb wheel switches, a digital keyboard etc., by means of which on the one hand in a very user friendly way and on the other hand also in a very accurate way signals, related to the minimum level and to the maximum level, can be delivered to the processor. Compared with the prior art apparatus the ease of operation and the comfort for the grower is enhanced significantly. Furthermore, thanks to the very simple operation a significant time saving is obtained.

Further advantage of the apparatus according to the invention follows from the fact that the variation of the level in the measuring reservoir is in fact registered continuously by the analog level measuring means. If the level variations are visualised as functions of time, than the grower is able to derive therefrom directly very interesting and very useful data. Therefore a preferred embodiment of the apparatus according to the invention is characterized in that the processor is coupled to display means onto which the variation of the level measuring means signal and therewith the variation of the fluid level in the measuring reservoir as function of time can be made visualized. Especially the angle of the slopes in the signal curve as the signal varies between a maximum and a minimum or vice versa provides important information about the velocity with which the fluid is absorbed by the plant or evaporated thereby and may eventually lead to further measures taken by the grower.

In this respect a preferred embodiment of the invention is characterized in that the measuring reservoir comprises a discharge channel containing a processor controlled valve, which valve is opened or closed by the processor when predetermined levels are reached.

After a lapse of time, a deposit of salts will be formed in the matting which should be removed during a so-called overdrain procedure known to the expert in this field. In this respect, a specific embodiment of the apparatus according to the invention is characterized in that the apparatus can be used in an overdrain mode in which, during a predetermined time period, the maximum level signal is neglected so that the level in the measuring reservoir rises to a predetermined further level at which the discharge valve is opened, causing the discharge of fluid until at another further level the discharge valve is closed. The opening and closing of the discharge valve can be repeated a number of times until the overdrain mode is ended, whereby the processor or computer is suitable programmed for calculating the amount of drained fluid based on the variations in the level measuring means signal as a function of time.

The invention will be explained in more detail with reference to the attached drawings.

FIG. 3 illustrates an example of the way in which the level measuring means signal varies.

Figure 1:
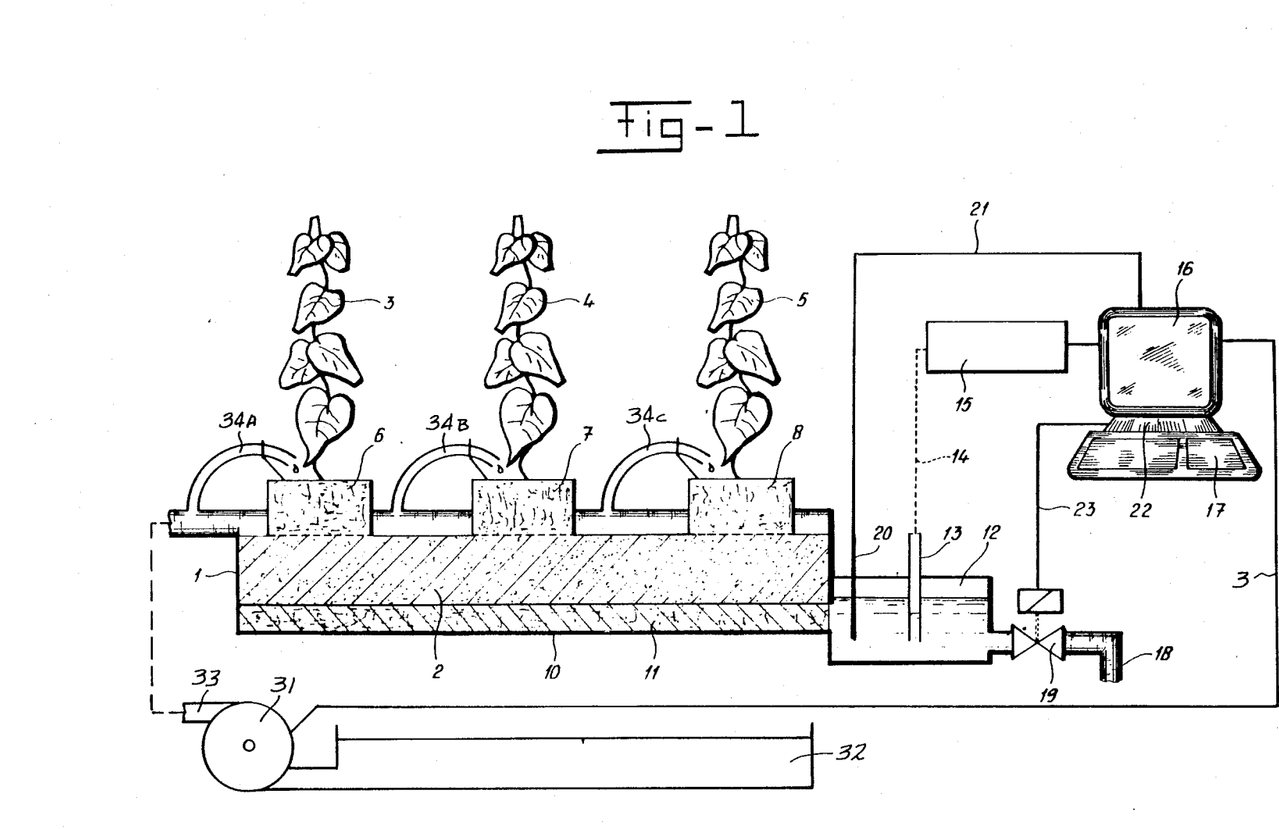
FIG. 1 shows schematically a general view of the main components of the apparatus according to the invention.

In FIG. 1 an embodiment of the apparatus according to the invention is shown in a more detailed manner. The apparatus comprises a fluid tight reservoir 1 with therein a substrate 2 onto which the plants (in this example three plants are indicated by 3, 4 and 5) are positioned each in a separate pot, respectively indicated by 6, 7 and 8. The growing of plants on a substrate is a technology which is considered as known to the expert in this field and will not be discussed in detail. As appears furthermore from FIG. 2, in which a cross-sectional view through the reservoir 1 is illustrated, a gutter 10 is installed underneath the reservoir 1 such, that the there is an open communication path between a slot in the bottom of the reservoir 1 to which the gutter 10 closely fits and the gutter itself. Within the gutter and onto the bottom wall of the reservoir 1 a matting consisting of fluid absorbing material of a material with capillary action, is installed. This material is indicated by the reference number 11.

At one end of the gutter a measuring reservoir 12 is installed having an open communication connection with the gutter as appears from FIG. 1. In this measuring reservoir, an analog level probe 13 is positioned. Through a suitable conduit 14, the probe 13 is connected to the level measuring unit 15. The measuring unit 15 supplies output signals to the computer 22 which in this example execute the function of the processor. In the usual manner the computer 22 comprises a display screen 16 and a keyboard 17 as well as a central processing unit.

At the lower end of the measuring reservoir 12, a discharge pipe 18 is connected in which a remotely controllable valve 19 is installed. The valve 19 can be operated through line 23 by means of a signal generated by the computer 22. Furthermore a separate alarm probe 20 is positioned in the measuring reservoir and connected through a suitable line 21 to the computer 22. This alarm probe only delivers a signal in case the fluid level in the measuring reservoir descends underneath an abnormal low value.

As shown in FIG. 1, the apparatus further includes a conduit system 33, connected through a pump 31 to a fluid source 32. The conduit system further includes a fluid dispensing orifice 34A, 34B, and 34C for each plant 3, 4 and 5.

Figure 2:
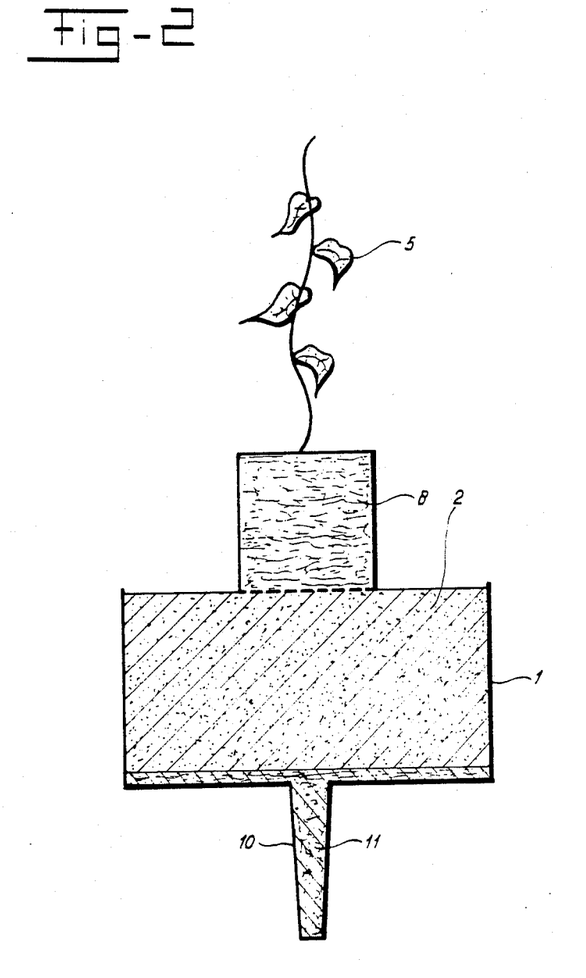
FIG. 2 illustrates a cross sectional view through the reservoir and through the gutter forming part of the apparatus according to the invention.

The operation of the circuit illustrated in the FIGS. 1 and 2 will be discussed in more detail with reference to FIG. 3. In FIG. 3, the variation of the output signal of the analog level probe 13 over a period of 24 hours as function of the time is shown. Along the vertical axis the water level is indicated in percentages. The 0% level as well as the 100% level in the measuring reservoir can be selected in an arbitrary way as will be discussed hereinafter. As appears from FIG. 3, the pump 31 was switched on in the morning at ±7.00 hours and water was supplied until the maximum level was reached. It is remarked that during the night all fluid was absorbed from the substrate and from the absorbing matter or was evaporated and that the level in the measuring reservoir was lowered until 0%. After reaching the maximum level, in this case adjusted to 70%, the pump 31 was stopped and the supply of water was at least for the time being ended. The plants require, as appears from the first rather broad peak in the diagram, apparently some time to adapt themselves to the new situation, however, thereafter they start absorbing the water resulting into a gradual lowering of the water level until 55%, corresponding to the adjusted minimum level. After reaching this minimum level the pump 31 is reactivated and again drop by drop fluid is added until the water level again reaches the maximum of 70%. Directly after the reactivation of the pump 31 the ascending fluid flow in the aborbing material 11 will have to be compensated before the level in the measuring reservoir will rise again. This appears also from the short horizontal sections in he curve of FIG. 3. This cyclic process is continued during the day until at ±18.00 hours the last fluid drops are delivered whereafter the level is allowed to descend even underneath the minimum level to create therewith a favourable situation for the night.

As appears from FIG. 3 the velocity with which the fluid evaporates respectively is absorbed by the plant during the morning increases whereafter the velocity obtains a rather stable character. The computer 22 is preferably programmed such, that from the input signal, received from the level probe 13, the slope is determined between its maximum and its minimum (70%, respectively 55%), which slope is directly related to the velocity with which the water level in the measuring reservoir varies. Furthermore, the computer can be programmed such that with a velocity which is too high or too low (to be determined separately for ascending and descending parts of the curve an alarm signal is generated. The velocity differences may be caused (at least partly by climatological changes during the day). One of the factors playing a role thereby is the sunlight radiation. As appears from FIG. 4 an increasing sunlight radiation results into an increasing evaporation which becomes evident from a faster descending level curve between a maximum and the adjacent minimum. Based on the momentary slope angle, which can be determined for instance by the computer 22, the grower is now able to take decisions about opening or closing windows, lowering or rising the temperature and if necessary adapting the humidity. This slope angle can be made visible on the screen of the computer; however, it is also possible to directly generate a control signal for instance to a mechanism for controlling the windows or to a climate control device in which this signal is processed as one of an eventual larger number of detection signals.

Figure 4:
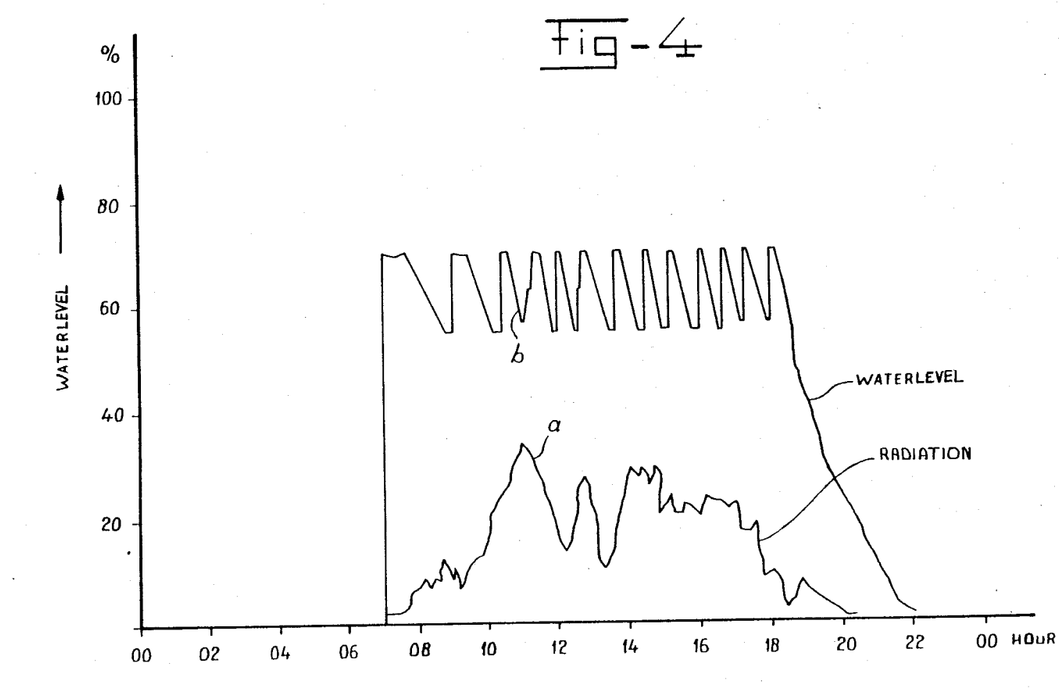
FIG. 4 illustrates in a diagram the relation between the sunlight radiation and the water level.

In FIG. 4 the slope angle of the curve is measured continuously. The slope indicated by b caused by the peak a in the sunlight radiation, initiated the computer to activate the pump 31 already before the minimum level was obtained.

Figure 5:
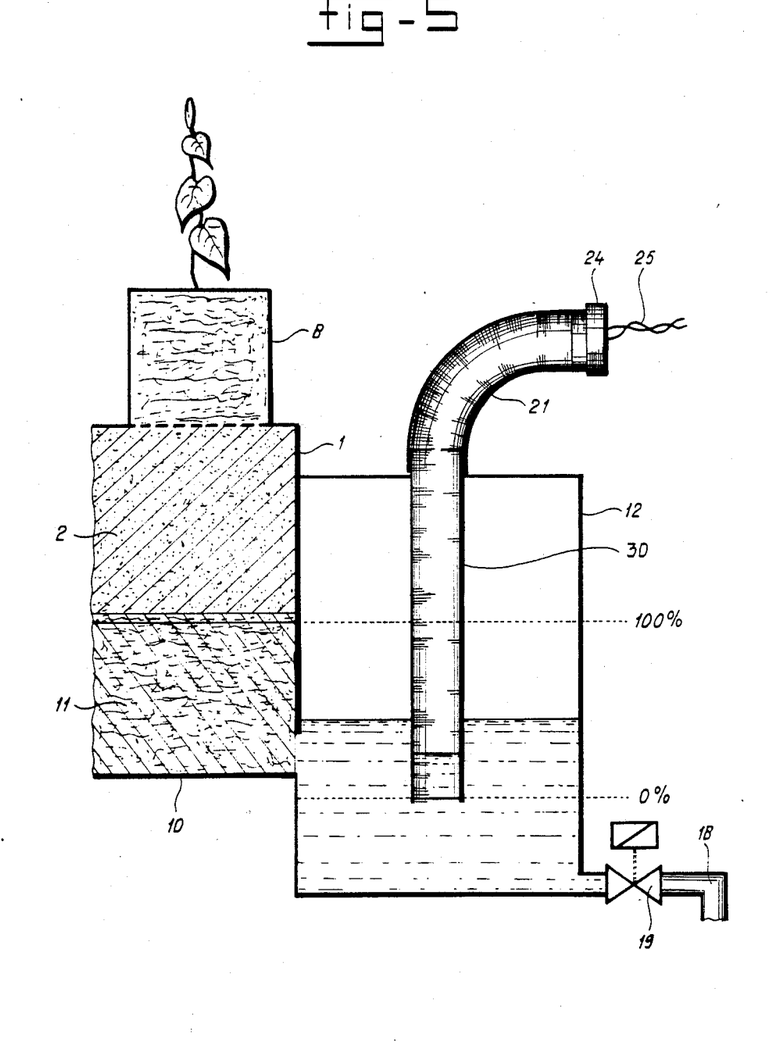
FIG. 5 provides more details about the analog level measuring means.

Above the attention is drawn to the fact that the apparatus according to the invention uses an analog level measuring device. Although one could think of a simple floating body coupled to a position-voltage-converter such as a potentiometer or a similar device, it is preferred to use an embodiment without any moving parts. A possible embodiment is schematically illustrated in FIG. 5. In this figure a cross-section is shown through a part of the reservoir 1 with the gutter 10 and the thereto connected measuring reservoir 12. Furthermore in this figure the discharge valve 19 and the discharge channel 18 are illustrated. In the measuring reservoir a pipe 30 is installed, the upper end of which in an air tight manner connected to an air conduit 21. The other end of this air conduit is air tight connected to a pressure sensitive sensor 24. Such sensors are commercially available in various embodiments and do not require any explanation. Through the electrical wiring 25 the output signal of the sensor 24 is supplied to a level measuring circuit (15 in FIG. 1) with which the output signal of the sensor 24 is converted into a signal suitable for reception by the computer 22.

The 0% level in this embodiment is selected arbitrarily by the lower end of the pipe 30, which lower end is furthermore positioned underneath the lowest level of the gutter 10, so that the analog level detector can be calibrated easily. If fluid is poured into the initially empty measuring reservoir then the output signal of the pressure sensor will not show any change until the moment the 0% level is reached. At that moment the volume of air within the pipe 30 and within the conduit 21 is closed by the fluid and each further rise of the fluid level in the actual measuring reservoir will result into a pressure increase in this closed volume of air resulting into a thereto corresponding output signal of the pressure sensor 22. The 100% level can be calibrated once very simply for instance at the level of the bottom of the reservoir 1. The output signal of the pressure sensor, corresponding to this level, is assigned to the 100% level and the intermediate variation of the signal can be stored into the memory of the computer as a calibration curve. Therewith the apparatus is ready for use.

By means of the keyboard the grower is able to input very simply percentage values for a selected minimum and maximum level into the computer. During operation in the computer continuously the output signal of the pressure sensor 22 is compared to these maximum and minimum values and if one of these limit levels is reached the pump is switched on or is switched off.

If for one reason or another the level in the measuring reservoir would descend until the alarm probe 20 becomes free, then the resulting signal therefrom is processed by the computer into a suitable alarm signal. If on the other hand for one reason or another the level in the measuring reservoir would ascend above a predetermined limit value, for instance 75% in FIG. 3, then the computer has the ability to open a valve 19 until a predetermined lower level is reached at which level the valve 19 is closed again.

In a plant growing firm in general a number of such apparatusses will be used alongside each other, either for the same type of plants or for different type of plants per apparatus. It is not necessary to duplicate the whole system each time. The computer can be used in multiplex configuration for controlling a large number of such apparatusses.

Figure 6:
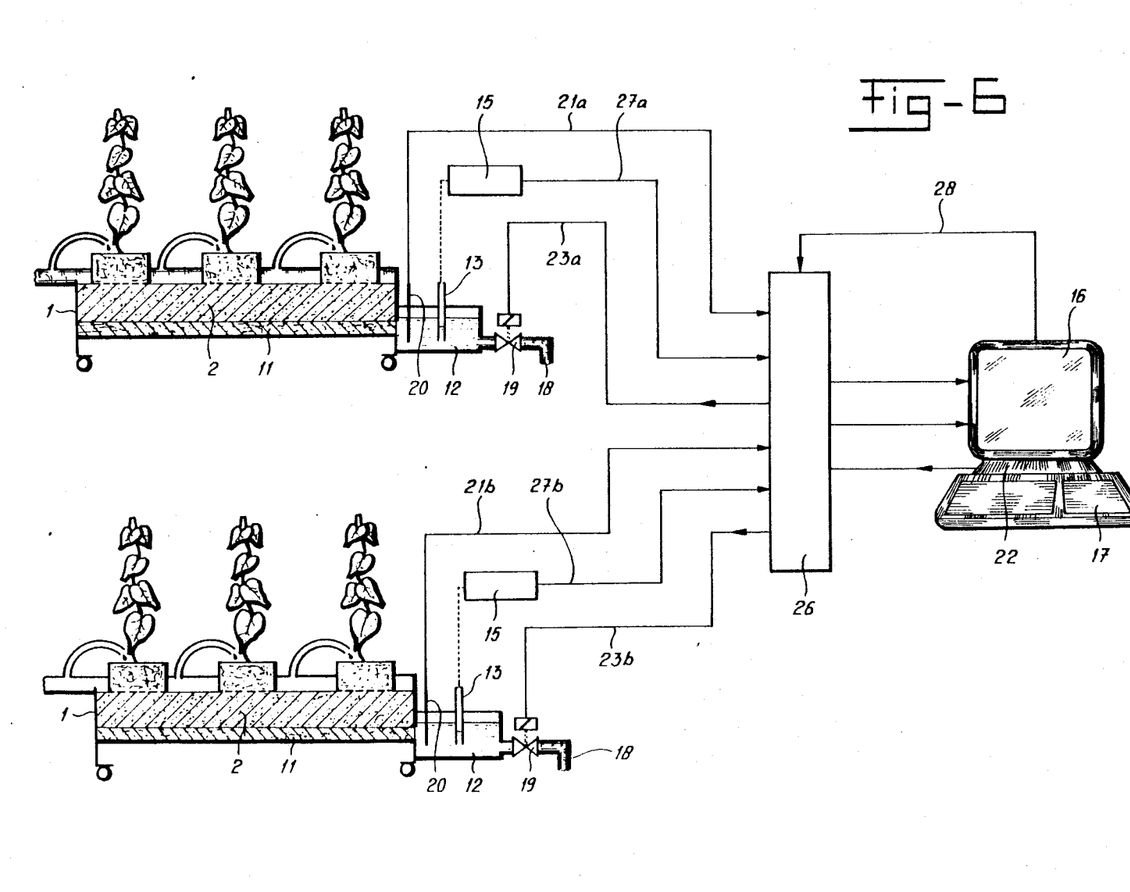
FIG. 6 illustrates a multiplex configuration, in which a number of apparatusses according to the invention are combined with one single processor.
Figure 7:
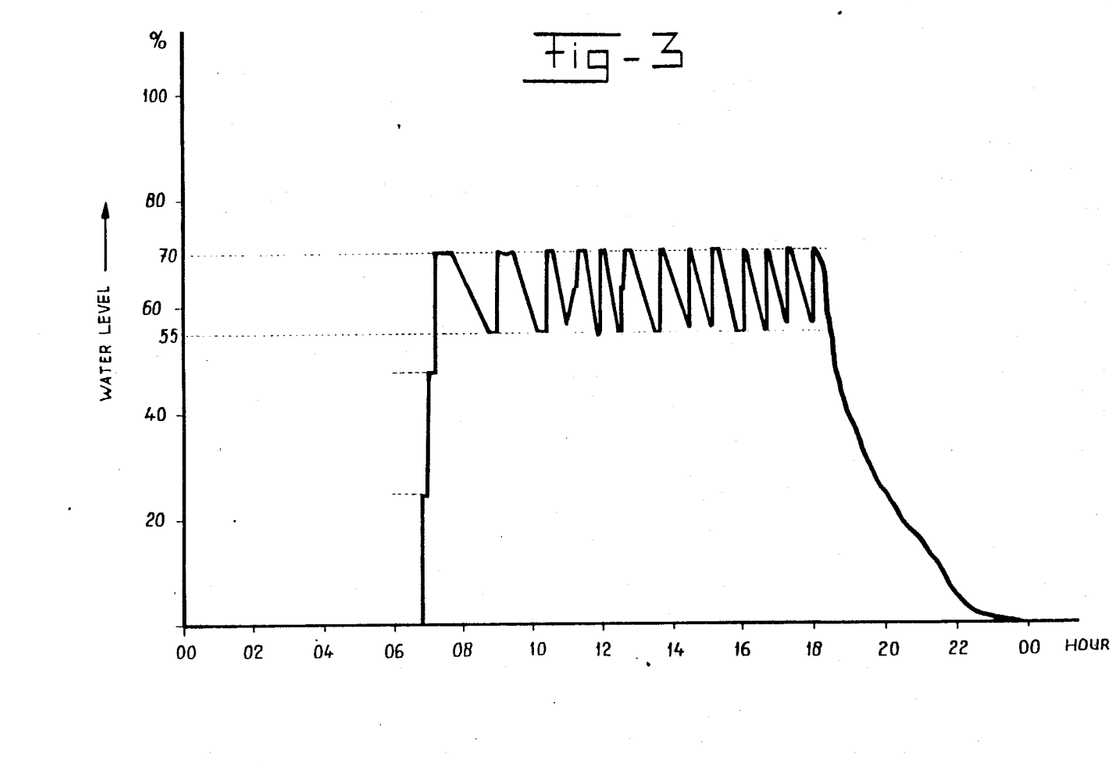

FIG. 6 illustrates an example of a system comprising two units as schematically indicated in FIG. 1, connected through a multiplexer to a central computer. Each of the separate units has two output lines and one input line, more specifically an output line 21a, 21b for the alarm probe, an output line 27a, 27b for the level detection circuit and an input line 23a, 23b for controlling the discharge valve 19. Between the computer 22 and the multiplexer 26 corresponding lines 21c, 27c and 23c are installed. The function of the multiplexer 26 is controlled through a line 28 by the computer. The functioning of multiplex systems is regarded as within the knowledge of the expert in this field and will not be discussed in detail therefore.

It will be clear that such a multiplex system is able to control a large number of separate apparatusses each with own parameters in a very comfortable and easy way by the grower. Data of each of these separate apparatusses can be stored in a memory and, selected by the user, visualised onto the screen. It will furthermore be clear, that dependent on the used computer, it is not necessary under all circumstances to use a separate multiplexer 26. Many computers have an integrally built in mulplexer function.

I claim:
1. Apparatus for automatically watering plants, comprising:
   a fluid tight reservoir containing a substrate on which plants are positioned;
   a gutter running underneath said reservoir in open communication with a bottom of said reservoir;
   a fluid absorbing matting installed within said gutter and at least on a part of the bottom of the reservoir;

a measuring reservoir in open communication with said gutter;

level metering means installed within said measuring reservoir;

a conduit system, connected through a pump to a fluid source;

said conduit system including a fluid dispensing orifice for each of said plants;

a processor which receives signals from said level measuring means and supplied control signals to said pump;

said level measuring means being an analog level measuring means for generating a signal to be delivered to said processor proportional to a fluid level in said measuring reservoir;

adjustment means for supplying at least one reference signal for determining a maximum level and a minimum level, to said processor; and the processor comparing at least one of an output signal of the level measuring means and a signal derived therefrom with said at least one reference signal to start the operation of the pump in a first case where one predetermined signal combination is detected and to stop the functioning of the pump in a second case whee another predetermined signal combination is detected.

2. Apparatus according to claim 1, further characterized in that the processor generates an output signal related to a derivative of the level measuring means signal, said output signal being used for controlling systems for influencing the environmental climate.

3. Apparatus according to claim 1, characterized in that the processor generates an output signal related to a derivative of the level measuring means signal, said output signal during operation of the apparatus being supplied to a further processor programmed to control systems for influencing the environmental climate.

4. Apparatus according to claim 3, characterized in that both processors are combined in a single programmed computer.

5. Apparatus according to claim 1, characterized in that the processor comprises means for determining the derivative of the level measuring means signal and a velocity with which the fluid level in the measuring reservoir changes; and said processor being used to control the opeation of the pump therewith.

6. Apparatus according to claim 2, characterized in that the processor compares the level measuring means signal with the at least one reference signal to switch off the pump when the maximum level is reached and to switch on the pump when the minimum level is reached.

7. Apparatus according to claim 1, characterized in that the processor is coupled to a display means on which variations in the level measuring means signal and therewith variations of the fluid level in the measuring reservoir as function of time can be visualised.

8. Apparatus according to claim 1, characterized in that the measuring reservoir comprises a discharge channel containing a processor controlled valve, said valve being opened or closed by the processor when predetermined levels are reached.

9. Apparatus according to claim 8, characterized in that said apparatus being operational in an overdrain mode during which the maximum level signal is neglected for a predetermined time period so that the level in the measuring reservoir rises to a predetermined level at which the valve opens causing the discharge of fluid, said valve remaining open until it is closed at another further level, said opening and closing of the valve being repeated a number of times until the overdrain mode is ended, whereby the processor calculates an amount of drained fluid based on variations in the level measuring means signal as a function of time.

* * * * *